US007751934B2

(12) United States Patent
Konietzko

(10) Patent No.: US 7,751,934 B2
(45) Date of Patent: Jul. 6, 2010

(54) PROGRAM CONTROLLED STIRRER AND METHOD FOR THE OPERATION THEREOF

(76) Inventor: Albrecht Konietzko, Oberer Stephansberg 49 g, Bamberg (DE) 96049

( * ) Notice: Subject to any disclaimer, the term of this patent is extended or adjusted under 35 U.S.C. 154(b) by 962 days.

(21) Appl. No.: 10/381,744

(22) PCT Filed: Sep. 25, 2001

(86) PCT No.: PCT/EP01/11060

§ 371 (c)(1), (2), (4) Date: Mar. 25, 2003

(87) PCT Pub. No.: WO02/26369

PCT Pub. Date: Apr. 4, 2002

(65) Prior Publication Data

US 2004/0029772 A1 Feb. 12, 2004

(30) Foreign Application Priority Data

Sep. 27, 2000 (DE) ................................ 100 49 002

(51) Int. Cl.
*G06F 17/00* (2006.01)

(52) U.S. Cl. ......................... 700/239; 700/265; 366/17; 366/286; 366/601

(58) Field of Classification Search ................. 366/286, 366/601, 17, 273; 700/123, 239, 265, 285
See application file for complete search history.

(56) References Cited

U.S. PATENT DOCUMENTS 4,403,866 A * 9/1983 Falcoff et al. ............... 366/132
5,145,250 A * 9/1992 Planck et al. .................. 366/8
RE34,776 E * 11/1994 Pratt ........................... 366/17
5,363,746 A * 11/1994 Gordon ....................... 99/328
5,487,603 A 1/1996 Hoff et al.
5,622,692 A 4/1997 Castro et al.

(Continued)

FOREIGN PATENT DOCUMENTS

DE 3126552 1/1983

(Continued)

*Primary Examiner*—Jeffrey A Shapiro
(74) *Attorney, Agent, or Firm*—Mayer & Williams PC; Karin L. Williams, Esq.; Mark D. Wieczorek, Esq.

(57) ABSTRACT

The invention relates to a program controlled stirrer for producing pharmaceutical or cosmetic recipes, comprising a stirring unit which consists of a stirring tool which engages with a mixing receptacle. According to the invention, the stirring unit is coupled to a micro-processor which determines the length of stirring time and stirring speed at the stirring unit in a program-controlled manner. The micro-processor executes a data-processing program with the following steps: input of variable data; input of constant data; determination of the length of stirring time and stirring speed in order to produce the desired amount of the recipe by combining the variable and constant data; conversion of the determined length of stirring time and stirring speed into corresponding first current or voltage values; control of the stirring unit with said first current or voltage values. Preferably, the size of the receptacle is inputted as variable data, whereby the data-processing program calculates the number of necessary rotations of the stirring tool using the constant data stored in the data memory, then controls the stirring unit correspondingly.

9 Claims, 2 Drawing Sheets

U.S. PATENT DOCUMENTS

| | | | | | |
|---|---|---|---|---|---|
| 5,967,023 | A | * | 10/1999 | Acknin et al. | 99/348 |
| 6,042,259 | A | * | 3/2000 | Hines et al. | 366/17 |
| 6,161,956 | A | * | 12/2000 | Jerkel | 366/160.4 |
| 6,664,359 | B1 | * | 12/2003 | Kangas et al. | 528/38 |

FOREIGN PATENT DOCUMENTS

| | | |
|---|---|---|
| DE | 3919534 | 12/1990 |
| DE | 4302085 | 7/1994 |
| DE | 19641972 | 4/1998 |

* cited by examiner

PROGRAM CONTROLLED STIRRER AND METHOD FOR THE OPERATION THEREOF

BACKGROUND AND SUMMARY OF THE INVENTION

This invention relates to a method for the use of a program controlled stirrer for producing pharmaceutical or cosmetic recipes or the like, comprising an electric stirring unit whose revolutions can be controlled, consisting of a stirring unit which reaches into a mixing receptacle, whereby the stirring unit is coupled to a micro-processor which determines the length of stirring time and stirring speed at the stirring unit in a program-controlled manner.

For example, for pharmaceutical or cosmetic medical prescriptions, one step recipes are produced from ointments, powder mixtures, gels and the like. In the singular preparation of such recipes, which usually takes place in pharmacies, the components of the recipe are manually mixed using traditional methods. To do this, mortar and pestle as well as glass plate and spatula can be used. In addition to the risk of contamination to the substances being produced due to the manual procedure, there is also the problem that the conditions in which the mixing of the single substances is carried out are not reproducible and documentable. Thus in the repeated production of the same recipe significant quality differences may result, which could affect the effectiveness of the recipe.

A device for stirring, mixing, chopping or the like is known from DE 196 41 972 C2. Such a device (which can be referred to as stirrer) features a stirring unit and a lifting unit to mix certain substances together using a stirring tool in a mixing container in a partly automatic manner so as to obtain the desired recipe as a result. With this device, according to the state of the art, it is possible to change the stirring speed, the stirring time, the stroke rate and the lifting speed within set limits so as to adjust them to special types of recipes. These parameters of the stirrer must be adjusted to the characteristics of the initial substances as well as to the relevant amount of these substances for the result from the mixing process to be satisfactory. The disadvantage of this known device lies in that the optimal parameters of the different mixing processes do not remain available for a long period of time and therefore must constantly be re-input. Individual inputs of mixing time, number of revolutions per minute of the stirrer, lifting speed and stroke rate are not reproducible at a later point in time. Thus, special recipes, both in the case of their production by different pharmacies and in the repeated production by the same pharmacy at different points in time, can have highly variable qualities. In this way, for the same medical prescription a quality uniformity (Good Manufacturing Practice—GMP) cannot be assured.

DE 39 19 534 A1 shows a method and a piece of equipment for the preparation of bone cement. According to this method, an automatic process command is provided so that the mixing phase and/or the rest phase are selected in consideration of the relevant type of bone cement and the amount of it being used. The operation of the described piece of equipment is, however, relatively costly because the control parameters must be manually input. Moreover, the documentation of the mixtures obtained is not assured and therefore the repeatability for identical mixtures cannot be guaranteed.

A method for the control of stirring processes is known from DE 31 26 552 A1. Based on the viscosity of a substance, the optimum power input of the stirrer is adjusted. Additionally, the viscosity can be continuously set during the stirring process. Repeatable, documentable and fast production of mixtures from the automatic use of the parameters based on container size is therefore not achieved.

Finally, DE 43 02 085 C1 reports on a method for the dosing and mixing of dental filling substances made up of several components and on the piece of equipment for the application of the method.

One task of this invention is to minimize quality differences in the production of individual ointment recipes. An additional task lies in facilitating the use of stirrers so that cosmetic and pharmaceutical products can be produced with the desired quality even by less qualified personnel. Moreover, the invention must allow for the production of individual recipes resulting in equal quality that are produced with long time intervals between productions and enable an increase in effectiveness in the repeated production of such recipes.

These and other problems are solved by a method which includes the following steps:

- Input of variable data into data input devices which define at least:
  - the amount and the category of the recipe to be produced within a given tolerance range and,
  - the size of the mixing receptacle;
- Input of nonvariable data from a data memory which, for preset categories of recipes and sizes of mixing receptacles, contains the basic values for the stirring time and stirring speed;
- Determination of the length of stirring time and stirring speed in order to produce the desired amount of the recipe by combining the variable and nonvariable data;
- Conversion of the determined length of stirring time and stirring speed into corresponding initial current or voltage values and control of the stirring unit with these control parameters;
- Storage of the control parameters adopted during the production of the recipe, together with identification data in a data memory;
- Output of the control parameters and/or identification data adopted, through a data output device, in electronic and/or printed form.

The main advantage of the stirrer according to the invention lies in that a GMP-compliant quality uniformity of the recipes to be produced can widely be assured. It is guaranteed that the same recipe will be produced using the same mixing conditions. Moreover, errors in the use of the stirrer are widely prevented.

An advantageous embodiment of the program controlled stirrer also includes a lifting unit, through which the relative position of the stirring tool in the mixing receptacle can be changed during the stirring process, whereby the data-processing program executed by the micro-processor includes the following steps:

- Determination of the necessary stroke rate and lifting speed in order to produce the desired quality of the recipe by combining the variable and nonvariable data;
- Conversion of the determined stroke rate and lifting speed into corresponding initial current or voltage values;
- Control of the lifting unit with said initial current or voltage values.

The inclusion of the lifting unit in the control through the micro-processor further increases the quality uniformity required by the Medicines Act. Moreover, in this way it is also possible to adjust the stirring mode to the special initial substances and the desired end product. At this point it must be specified that in this context the word "stirring" also refers to the chopping of the initial substances, the mixing and blending of the initial substances as well as any other kind of preparation that can be performed by the stirring tool in the mixing receptacle.

By using the program controlled stirrer, ointments, gels and other pasty masses can be produced. Besides, single powdery substances can be blended together if this is necessary for a certain recipe. Different stirring tools can be fitted, which in size and shape are adjusted to both the mixing receptacle and the mixing task to be fulfilled.

According to a practical embodiment, variable data on the viscosity of the initial substances is input through the data input devices. If required, additional data describing the substances or guideline values concerning the stirring time, the stirring speed, the stroke rate and the lifting speed can also be input. When using guideline values, the program controlled stirrer compares these guideline values with the minimum values stored in the data memory and adopts these minimum values if the guideline values are below the minimum values. In this way a seriously incorrect condition of the stirrer is avoided because a minim quality of the relevant recipe is guaranteed by the application of the minimum values. In another modified embodiment it is also possible to compare the guideline values with maximal values stored in the data memory.

A particularly preferred embodiment of the stirrer enables the storage of the control parameters adopted during the production of the recipe, i.e. either the stirring time, the stirring speed, the stroke rate and the lifting speed or the current or voltage values being utilized to command the stirring unit and/or the lifting unit. This data is combined with the individualizing data so that, at a later point in time, the special control parameters adopted can be tracked back through the individualizing data, should an identical recipe be produced again. As another advantage, this measure also brings about a significant time saving because the control parameters for the stirrer must be input only once and can be quickly called up from the data memory for a later production of the same type of recipe.

In another enhanced embodiment of the program controlled stirrer, an output unit is also provided, through which the control parameters to be adopted and, if required, also the identification data, can be output. For example, the identification data can be printed on a label that can be put on the packaging of the produced recipe. In this way, the identification data is available when a new order of the same recipe is made with the used packaging unit.

Obviously the output of the data in electronic form is also possible. In other embodiments, the data can be coded in a bar code so that all of the control parameters can be input with a scanner. This would also allow for standardization of the production in different pharmacies, seeing that not only the identification data but also the entire control data set can be encoded in a bar code.

When the program controlled stirrer is assembled as a stand alone device, a keyboard, a touch screen or a similar data input device is provided in order to store the variable data. In a modified embodiment, a PC is fitted with a data connection available for data input and also for data storage. The data connection, for example, can be made through a serial interface. This is particularly advantageous because in this way traditional computers can be used which are equipped with a special control program.

BRIEF DESCRIPTION OF THE FIGURES

Other advantages, details and further developments emerge from the following description of a preferred embodiment, with reference to the drawings. These show.

DETAILED DESCRIPTION

Figure 1:
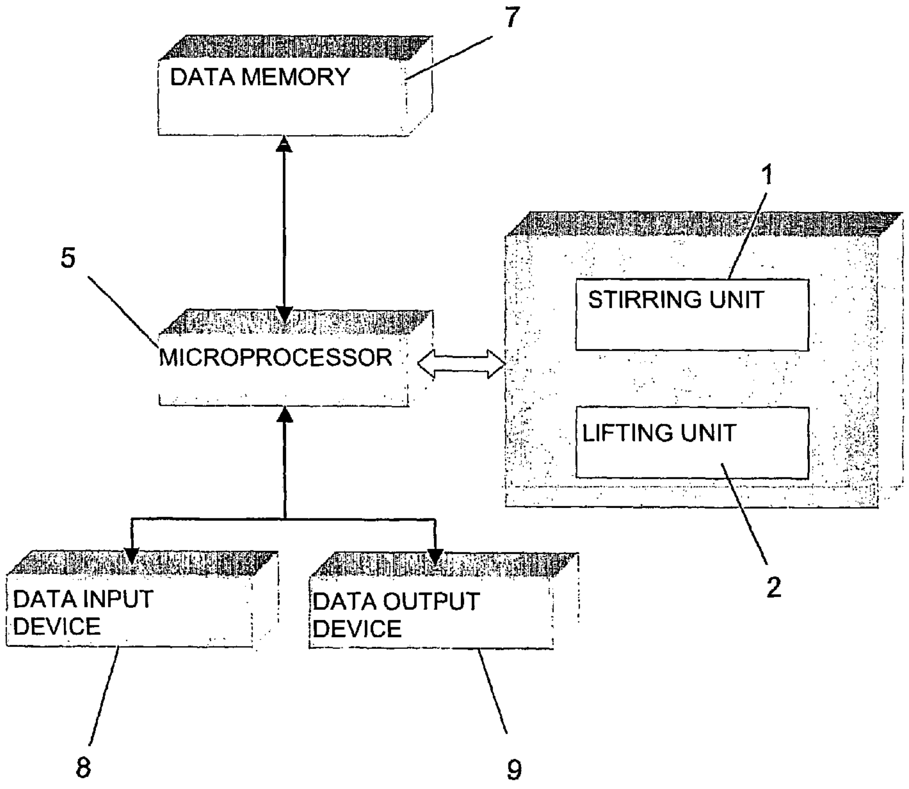
FIG. 1 a block circuit diagram of a program controlled stirrer.

FIG. 1 shows a simplified block circuit diagram of a preferred embodiment of a program controlled stirrer. The actual stirring device consists of a stirring unit 1 and a lifting unit 2. Through these two units, a stirring tool is driven, which works in combination with a mixing receptacle. The stirring tool is adjusted to the size of the mixing receptacle to reach an optimum stirring result. Preferably the stirring tool can be changed, for example when different sizes of mixing receptacles are used. Stirring tool 1 and lifting unit 2 work in combination with each other in such a way that the stirring tool rotates in the mixing receptacle and the relative position between the stirring tool and the mixing receptacle changes so that the stirring unit can properly mix all the areas inside the mixing receptacle. Therefore, it is possible to change the stirring tool in its vertical position and also to obtain the vertical movement by sliding the mixing receptacle with the stirring tool in fixed position.

The program controlled stirrer also features a micro-processor 5, which acquires the control of the stirring unit 1 and lifting unit 2. The microprocessor 5 executes a data-processing program, whose single process steps are illustrated in detail below. The control data supplied by the micro-processor 5 for the stirring unit 1 and the lifting unit 2 is converted into current or voltage values in a conventional manner, using known circuit elements (not shown). The micro-processor 5 can access a data memory 7 in order to load pre-set nonvariable data and/or store determined control data for a later mixing process. Furthermore, the micro-processor 5 works in combination with data input devices 8 and data output devices 9. Through data input 8, variable data can be input by the user. In particular, the user can set the amount of the recipe to be produced (for example a suspension ointment), the desired stirring time and the desired number of revolutions of the stirring tool. To achieve this objective, there is the opportunity to input the size of the mixing receptacle used so as to determine the optimum control values for the stirrer from this input. The micro-processor 5 combines the variable data input through the data input devices 8 with the nonvariable data that is stored in the data memory 7. The variable data is compared with minimum values and maximum values, which indicate the limit values allowed for the stirring speed, the stirring time, the lifting speed and the stroke rate.

It should be pointed out that the stirring process must not be carried out with nonvariable control values for the entire time. With certain substances it is appropriate to start with a low stirring speed and then proceed with a higher number of revolutions of the stirring tool to reach an optimum mixing result. After a so-called grating process, the number of revolutions of the stirring tool can be increased to produce an even mixture as quickly as possible.

The microprocessor 5 can output the control parameters used through the data output devices 9. The data output devices 9 can include a display indicating both the present operational status and the control parameters to be used during the mixing process. Moreover, a printer or an external data memory can be assigned to the data output devices 9 in order to store the control parameters in printed form, for example on the label of the recipe produced or on external electronic data memories for a later use.

Figure 2:
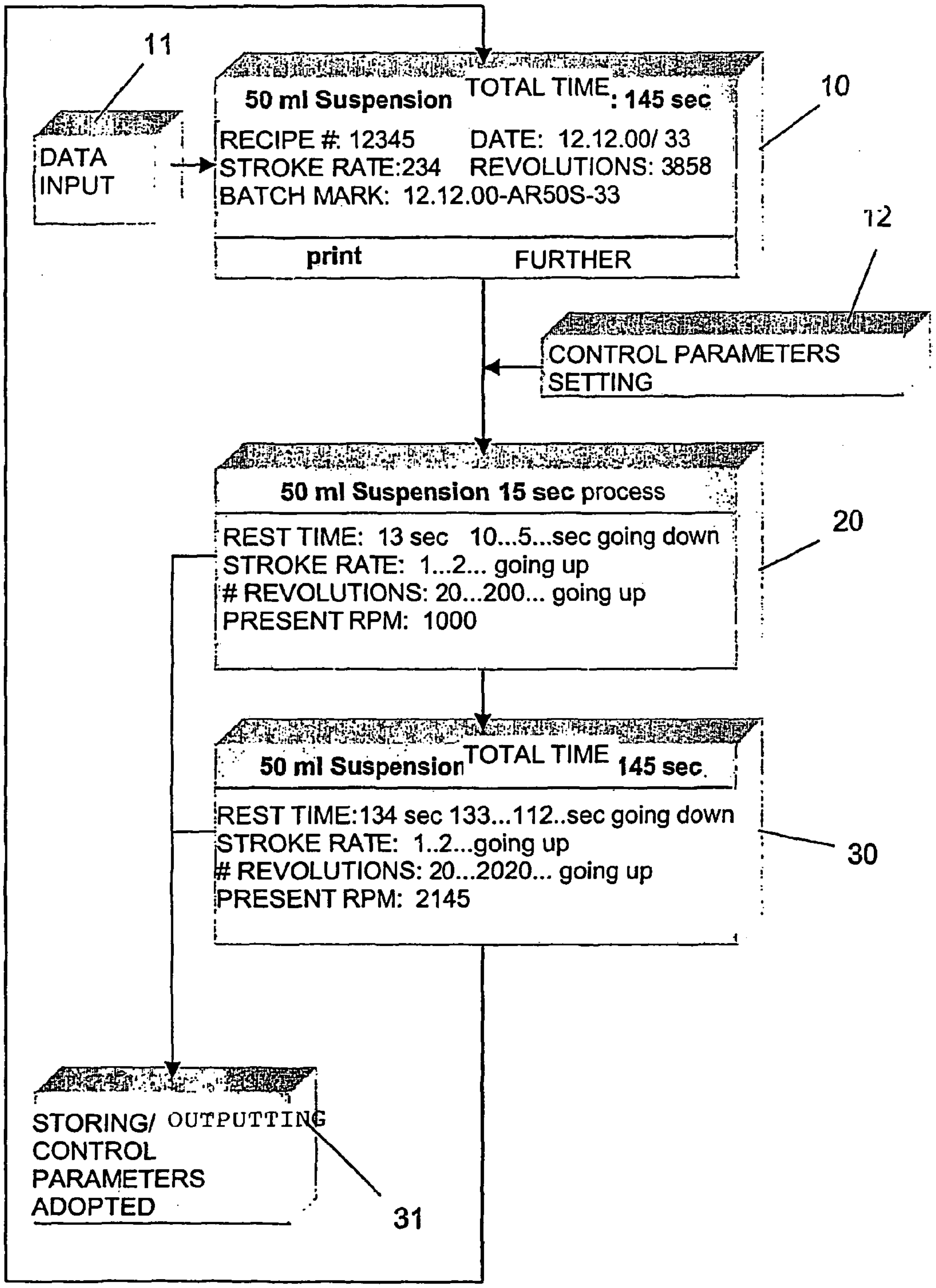
FIG. 2 a flow-chart of the information of the stirrer during the mixing process.

FIG. 2 shows a sequence of information from a reporting unit of the data output device during a mixing process performed by a program controlled stirrer. Based on this sequence, the essential steps executed by the program controlled stirrer, in which the control of these process steps is obtained through the data-processing program executed by the microprocessor are illustrated below.

In the illustrated example, a suspension ointment is to be produced in an amount of 50 ml. Step 10 reports the indication of when the data input is to be finished. First, the stirrer is put into service and the necessary data is input by the user through the data input devices in step 11. At a minimum the quantity of the suspension ointment to be produced is to be input, with the possibility of inputting additional optional data like, for example, the desired duration of the stirring process. Based on the data stored in the data memory, the data-processing program is able to independently determine all the other data right from the input amount of the recipe to be produced. In this case, stored guideline values for the stirring time, the stirring speed, the lifting speed and the stroke rate are used. The guideline values can be input by the manufacturer of the program controlled stirrer permanently into the data memory. There is also the possibility for the user to store the guideline values in a programming mode if this seems suitable for certain application cases. Moreover, the recipe number and, if available, a batch mark can be input or can be provided by the data-processing program. Such data is used as identification data, which enables a univocal classification of the mixing process performed according to the control parameters used. In the batch marking, all fundamental data is coded, for example the type of recipe (normal type, emulsion, suspension, reaction mix, powder or the like) and special instructions on the stirring process (for ex., with grating process when using suspensions).

When all guideline data has been input and the missing data necessary for a control of the mixing process has been determined by the data-processing program in step 12, the mixing process begins. In the example shown, the mixing process begins with the grating process that also in the batch marking is identified as "AR". Step 20 illustrates the indication that appears during the grating process. The rotation speed, which is adjusted to the special type of products to be produced is also reported. In this case the speed is 1,000 revolutions per minute (rpm). Furthermore, the number of revolutions and the stroke rate as well as the remaining mixing time are input.

After the conclusion of the grating process, the "normal" mixing process begins and the display changes to the status illustrated in step 30. Also here, the present rotation speed, the number of the revolutions to be executed, the stroke rate of the stirrer and the remaining time for the present mixing process are reported. Parallel to these indications, the control parameters adopted in step 31 are stored and/or output, for example decoded in the identification data printed on a label. After the conclusion of the mixing process, the display goes back to step 10 so that the user can control the correct completion of the recipe also from the display. Obviously, it is also possible to generate a modified conclusion report with which the user is informed of the successful completion of the mixing process in a summarized form.

In an adjusted embodiment a final fast homogenizing process can be carried out after an initial mixing phase. In this way, the total time of production of the recipe can be significantly shortened.

It is also useful to document the number of mixing processes executed and the resulting operation time of the stirrer in the data memory and have it available for maintenance. In this way, the user can be informed at the right time that the stirrer requires maintenance, thereby following recommended maintenance intervals, so that the life of the stirrer is increased and its functional safety is guaranteed.

Since a stirrer is preferably equipped with specially prepared mixing receptacles, a preprogrammed number of revolutions that the mixing tool must execute can be set for the various mixing receptacle sizes. The user must simply enter and save the receptacle sizes through the data input devices.

In a modified embodiment, sensors are installed which automatically detect the size of the receptacle so that input of this data occurs automatically without any direct action by the user.

The invention claimed is:

1. A method for the use of a program controlled stirrer for producing pharmaceutical or cosmetic recipes, comprising an electric stirring unit whose revolutions can be controlled, which includes a stirring tool extending into a mixing receptacle, whereby the stirring unit is coupled to a micro-processor which determines the length of stirring time and stirring speed at the stirring unit in a program-controlled manner; the program controlled stirrer including a lifting unit, through which the relative position of the stirring tool in the mixing receptacle can be changed during the stirring process, whereby the method includes the following steps:

inputting data into at least one data input device, the data defining at least the amount and the category of the recipe to be produced within a given tolerance range and the size of the mixing receptacle;

inputting nonvariable data from a data memory which, for preset categories of recipes and sizes of mixing receptacles, contains basic values for the stirring time and stirring speed;

determining the length of stirring time and stirring speed in order to produce the desired amount of the recipe by combining the variable and nonvariable data;

determining the optimum stroke rate and lifting speed in order to produce the desired quality of the recipe by combining the variable and nonvariable data;

converting the determined length of stirring time and stirring speed into a corresponding initial current or voltage value and controlling the stirring unit with these control parameters;

converting the determined stroke rate and lifting speed into corresponding second current or voltage values;

storing the control parameters adopted during the production of the recipe, together with identification data in a data memory;

outputting the control parameters and/or identification data adopted, through a data output device, in electronic and/or printed form; and controlling the lifting unit with said second current or voltage values.

2. The method according to claim 1, further including a step using the variable and nonvariable data to determine the number of the necessary revolutions for the stirring tool.

3. The method according to claim 1, further including the step of inputting the viscosity of the initial substances as variable data.

4. The method according to claim 1, further including the following steps:

loading guideline values for stirring time, stirring speed, stroke rate and lifting speed as additional variable data;

comparing said guideline values with preset minimum values, which are also stored in the data memory;

applying the minimum values for stirring time, stirring speed, stroke rate and lifting speed when the guidelines values are below the minimum values.

5. The method according to claim 1, further including the step of storing the maximum stirring time, stirring speed, stroke rate and lifting speed of the stirrer depending on the amount and viscosity of the various initial substances in the data memory.

6. The method according to claim 1, further including the following steps:

encoding the control parameters and/or identification data in a bar code;

outputting the encoded control parameters by printing them on a label of the packaging of the produced recipe.

7. The method according to claim 1, also including the following steps:

inputting a recipe identification as variable data;

inputting the control parameters, whose identification data corresponds to the recipe identification, from the data memory;

using the stored control parameters to control the stirring unit and the lifting unit;

such that the new recipe can be produced with the same parameters as a recipe that had been produced at an earlier point in time.

8. The method according to claim 1, in which the inputting the variable data is executed through a personal computer having a data connection with the stirrer, and whereby storing of the control parameters is executed in a data memory available on the personal computer.

9. The method according to claim 1, further including the step of automatically determining the size of the mixing receptacle and the amount of the initial substances using sensors.

* * * * *